Aug. 13, 1935.   A. KUBALLE   2,011,365
ADJUSTABLE SIEVE
Filed Aug. 5, 1933

Inventor: Arthur Kuballe
by Karl Viertel
Attorney

Patented Aug. 13, 1935

2,011,365

UNITED STATES PATENT OFFICE 2,011,365

ADJUSTABLE SIEVE

Arthur Kuballe, Mannheim, Germany, assignor to Heinrich Lanz, Aktiengesellschaft, Mannheim, Germany Application August 5, 1933, Serial No. 683,850
In Germany October 9, 1932

2 Claims. (Cl. 209—394)

My invention relates to farmers' implements for cleaning grain and other agricultural produce, and more especially to adjustable sieves of the type known, for instance from U. S. Patent 763,158, viz., comprising a plurality of corrugated sheet metal sections or slates, which are mounted on crank shafts or bars and are capable of being jointly swung around and set at different angles by an adjusting mechanism under the control of the operator.

It has been common practice heretofore to secure the said sieve sections on straight crank shafts by means of sleeves, as seen in Fig. 4 of U. S. Patent 736,158, or—preferably—by soldering or welding at the points of contact.

I have found that in practice there are two objections to that form of crank shafts:

The first one is, that—as the result of the concussions and vibrations to which the sieve is subjected under work—the soldered or welded joints where the crank shafts are fixed to the corrugated sheet metal slates are broken, and that the sieve must be frequently repaired which always is a rather troublesome and expensive affair in view of the fact that the sieve sections are difficult of access, and that long interruptions of the grain cleaning work, especially if occurring at the height of the season, mean a substantial loss to the farmer.

The second objection is that the crank shafts underneath the corrugated sieve sections form triangular recesses and remote corners difficult of access for supervision, cleaning etc., which soon become choked with all kinds of impurities from the grain, such as broken pieces of straw, husks, seeds, dust and dirt, and which thus offer considerable frictional resistance to the wind blown by a fan through the sieve during the grain cleaning operations.

The principal object of this invention is to overcome the aforesaid drawbacks by providing as supporting and adjusting members for the sieve sections crank shafts of improved yet simple design, which can be easily made and secured in a reliable manner to the corrugated sheet metal sections of the sieve at small expense.

In connection therewith the invention aims at so re-designing the said crank shafts that they will offer a minimum of resistance to the current of air blown through the sieve, and that the development of eddies and like irregularities in the flow of the air which would impair the separating work of the sieve are eliminated.

Still other objects of the invention will become incidentally apparent to practitioners in this field hereinafter.

The nature and scope of the invention are briefly outlined in the appended claims and will be more fully understood from the following specification taken together with the accompanying drawing, in which Fig. 1 is a fragmentary perspective view showing diagrammatically by way of an example, a sieve re-designed according to this invention.

Figure 1:
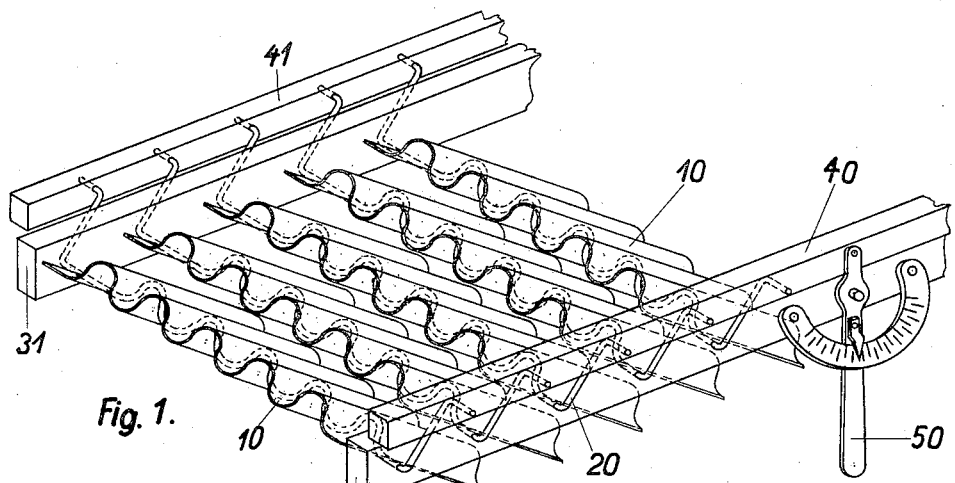
Fig. 1a is a fragmentary section in a larger scale taken across one of the sections of the sieve.

The improved sieve, perspectively shown in Fig. 1 by way of an example, consists of a plurality of corrugated sheet metal sections 10, which are cooperatively associated with each other in a manner known per se and are capable of being set at different angles by means of an adjusting mechanism,—the latter comprising crank equipped shafts 20 to which the sieve sections 10 are secured, a main frame 30, 31 in which the shafts 20 are rotatably mounted, a lever 50 pivotally mounted on frame 30, and an auxiliary movable frame 40, 41 cooperatively interconnecting the said lever and all the crank shafts 20.

Figure 1A:
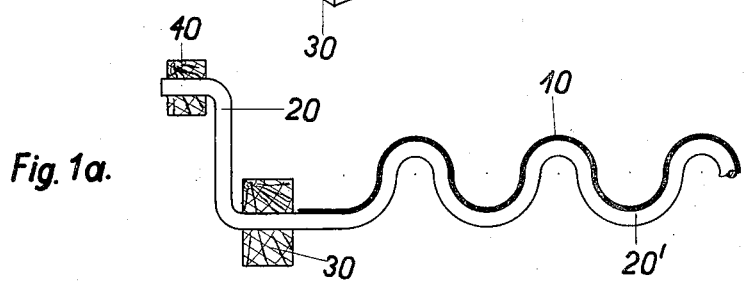

In order to obtain the advantages outlined above the crank shafts are formed according to this invention with undulations 20′ (Fig. 1a) to match those of the corrugated sieve sections, viz. so as to make an exact fit at the bottom side of the sieve sections and to be secured thereto by suitable means for instance by soldering, welding, riveting etc.

Figures 2, 2A:
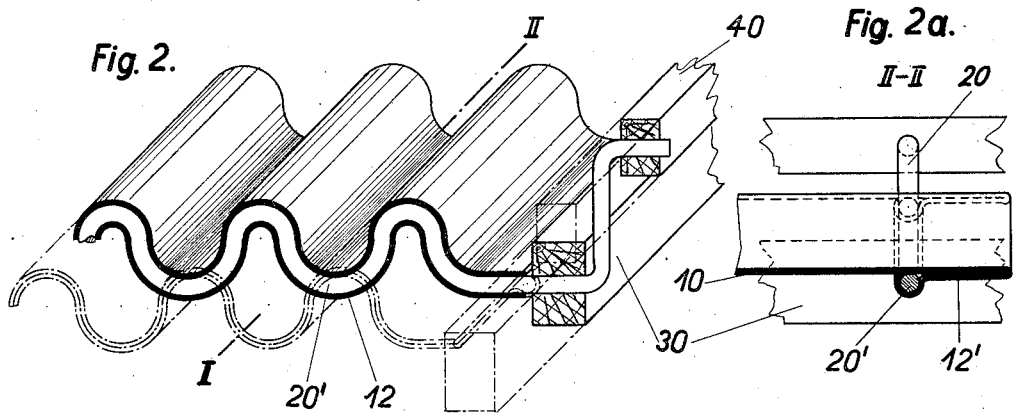
Fig. 2 is a cross sectional view showing a modified structural association of a crank shaft and a sieve section.
Fig. 2a is a longitudinal section through a sieve section taken on line II—II in Fig. 2.

In Figs. 2 and 2a a preferred form of securing the crank shafts 20 to the sieve sections 10 is shown: The undulated portion 20′ of the crank shaft is enclosed in a beaded strip 12 of corrugated sheet metal tightly fitting over the crank shaft 20′ and the bottom of the sieve section.

Various changes and modifications may be made in the deisgn and the assemblage of adjustable sieves of the type concerned and its component parts described above, without substantially departing from the spirit and the salient ideas of my invention.

For instance the beaded strip of corrugated sheet metal used for securing the crank shaft to the sieve section may be integral with the latter representing—as seen in Fig. 2a—the bottom member 12′ of the doubled up front edge of the sieve section. In this way the crank shafts are secured to the sieve in a very simple, reliable and wear resisting manner, viz. without any extra fixing means such as solder, rivets, etc.

What I claim is:

1. An adjustable sieve having a corrugated sheet metal sieve member and a crank member having undulations corresponding to the corrugations of said sieve member lying closely adjacent thereto throughout the length thereof, said sieve member being reversely bent upon itself to form an enclosing housing for said crank member, said housing having corrugations corresponding to and lying closely adjacent said sieve member.

2. An adjustable sieve comprising a plurality of corrugated sheet metal sieve sections arranged in parallel relation, a crank member for each of said sieve sections, each of said cranks having undulations conforming to the undulations of said sieve sections and lying closely adjacent thereto, and a beaded strip secured to said sieve member and enclosing said crank therebetween, said strip having undulations conforming to the undulations of said sieve section and crank whereby the distance between adjacent portions of adjacent sieve sections is substantially uniform.

ARTHUR KUBALLE.